United States Patent Office 3,365,273
Patented Jan. 23, 1968

3,365,273
RECOVERY OF ALUMINA FROM CLAY WITH ORGANIC POLYMERIC MATERIALS
Eric Siemers, Rte. 1, Box 362,
Land O'Lakes, Fla. 33539
No Drawing. Continuation-in-part of application Ser. No. 117,275, June 15, 1961. This application Mar. 24, 1965, Ser. No. 442,490
8 Claims. (Cl. 23—143)

This application is a continuation-in-part of my copending application Ser. No. 117,275, filed June 15, 1961, now abandoned.

This invention relates to a method of chemically separating siliceous alumina clays or minerals into silica and alumina. More particularly, this invention relates to a method of making this separation complete to a degree sufficient for the subsequent isolation of high purity alumina from aluminous clays such as kaolin by a variety of commercial processes. In particular, this invention relates to a method of treating an aluminous-siliceous mineral with an organic polymer which is capable of chemically abstracting from the aluminous-siliceous mineral oxygen atoms which are shared by the silica with the alumina constituents. Removal of these shared oxygen atoms breaks the bond between silica and alumina constituents, thus chemically liberating the alumina from the clay so that it can be isolated by chemical or physical procedures.

Alumina, as now produced commercially, is obtained from bauxite as the main mineral source of supply. Major sources of bauxite are rapidly becoming depleted and the remaining large sources of bauxite are limited. It is, therefore, of great commercial importance to develop a method for efficiently removing alumina from domestic clays, particularly from kaolin which is widely available in large deposits throughout the Southeastern states. Procedures for preparing highly prified alumina from kaolin and other clays on a commercial scale have not been successful to date. In certain laboratory processes, it is possible to prepare alumina from kaolin, as, for example, by dissolving the silica portion in hydrofluoric acid, but large scale developments have not been successful.

It is an object of this invention to provide a method of removing alumina from clay. It is a further object to provide a method whereby clay can be reacted with an organic polymeric material to produce alumina. These and other objects are apparent from the following disclosure.

Kaolin empirically consists of one mole of alumina combined with two moles of silica and two moles of water, the latter being assumed to be water of hydration. The empirical formula for kaolin is $Al_2(OH)_4Si_2O_5$. The normal oxygen content of silicon dioxide is 2; therefore the empirical formula can be written as $Al_2(OH)_4OSi_2O_4$ or as:

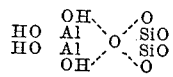

in which the alumina exists in the aluminum hydroxide form and the silica in the dioxide form. The individual kaolin particles are known to consist of "plates" and "stacks" formed by a number of plates piled on top of each other. Kaolin, while not carrying an inherent primary valence charge, carries a small edge charge which is predominantly negative. Although previous attempts to isolate alumina from kaolin by treatment with sulfuric acid or with caustic alkali have not been worked out satisfactorily, the present invention is based on the observation that it is possible to break down the alumina-silica bond in kaolin and related clays by treatment with organic polymers. The silica unit is thereby disassociated from the alumina unit which can then be extracted by suitable methods without difficulty. Any industrially known method can be used for dissolving the alumina and precipitation in any desired form (aluminum nitrate, oxide, sulfate, chloride, etc.) as well as in the desired purity, since the recovery process selected may have an effect on solubility of the silica fraction too.

The yield of the alumina end product also is influenced by the recovery process and by the economics of the process selected. For example, in recovering alumina from bauxite, it is usually more economical to leave certain quantities of alumina in the tailings instead of trying to accomplish a 100% yield. By such a procedure, it is possible to produce alumina which contains only trace quantities of silica not greater than about 0.03%.

In accordance with the present invention an aluminous-siliceous mineral is reacted with an organic polymer such as protein or carbohydrate. In the reaction, the polymer is broken down into smaller units of low molecular weight which accept oxygen from the mineral compound by robbing the oxygen atom shared by the $Al_2$ and $Si_2$ groups, thereby breaking the bond between them. The aluminum hydroxide can be converted to any other aluminum compound by any of the well known methods. In this way the silica is chemically removed from the aluminous-siliceous mineral and the inorganic residue of alumina and other inorganic materials can be treated with an inorganic reagent, such as a mineral acid or caustic alkali, to dissolve the aluminum in the form of a soluble aluminum salt or an aluminate salt. The alumina can be recovered from such salts by treatment with sufficient alkali or acid to neutralize the solution of the salt, thereby precipitating aluminum hydroxide (hydrous alumina) from which alumina of high purity can be obtained by separation, washing and drying.

The reaction of the silica in the aluminous-siliceous mineral with the organic polymer can take place under a variety of conditions. The reaction by which the oxygen bridge between the aluminum hydroxide and the silicon dioxide is broken can take place under a variety of conditions. Ordinarily it is advantageous to suspend the mineral in finely divided state in aqueous acid (pH 3 or lower) with an excess of the organic polymer and heat the mixture with good agitation to a temperature from 50° F. to 250° F., temperatures from 180° F. to 212° F. being preferred. The reaction can also be carried out under pressure in an autoclave at 50–60 p.s.i. in a nitrogen atmosphere at a temperature of 230–235° F. Elevated temperatures are not necessary but usually aid in the mixing and agitation of materials. Equivalent results can be achieved with good agitation or mixing at ambient temperature. Such organosilicon compounds are described in my copending applications, Ser. No. 68,615, filed Nov. 14, 1960, now abandoned, and Ser. No. 22,666, filed Apr. 18, 1960, now abandoned. The excess of silicon dioxide in the kaolin with a ratio of 56 g. silicon dioxide to 100 g. organic polymer results in an organosilicon compound only to the extent that silicon dioxide can be taken up by the organic polymer which, under the conditions of the reaction described herein, can only amount to less than 56%. These organosilicon compounds are soluble in organic solvents and have physical properties which are completely different from those of silica. Consequently, the organosilicon compounds can be separated from the inorganic residue of the mineral, which contains alumina, by physical separation procedures, such as suspension in aqueous solutions or solution in organic solvents, such as lower aliphatic esters, alcohols and ketones. After the silica in the form of an organosilicon compound is chemically separated from the mineral, the residue containing alumina can be treated by conventional procedures to purify and isolate the alumina. Ordinarily this is done by dissolving the alumina in dilute sulfuric acid, whereupon a solution of aluminum sulfate is formed which can be purified by filtration and clarification and subsequently the alumina can be recovered from the solution of aluminum sulfate by neutralization with alkali to precipitate hydrous alumina, which can be calcined to produce alumina of high quality.

This invention is applicable to the separation of alumina from aluminous-siliceous minerals, and particularly kaolin (white or china clay), such as anauxite, dickite, kaolinite and nacrite. It is also applicable to other aluminum silicate minerals, such as aluminite, halloysite, kyanite and pyrophyllite. The organic polymers which can be used in this invention include both the natural and synthetic polymers which are capable of associating with the oxygen atoms of the silica of the mineral, thereby breaking the aluminum-silicon oxygen bond in the aluminous-siliceous materials by "robbing the oxygen". For instance, polysaccharides (e.g., starch and cellulose), rosin, vegetable and animal protein or combinations thereof may be used. Synthetic resins, such as vinyl, acrylic and polyester resins can be used.

Among the carbohydrates which are operative in this invention are polysaccharides, starches and cellulose. Starches such as corn, rice, wheat and potato starch are operative, even in their natural form in the plant. Other starchy materials such as tapioca, sago, maize, sorghum and arrowroot are suitable, either in natural or refined form. Natural products such as chopped sugar cane, sorghum, sugar beets, potatoes or yams or crushed corn, wheat and other cereals are useable. Cellulosic materials such as wood cellulose, cotton linters, flax, waste paper, rayon and sawdust are suitable.

The vegetable and animal proteins which are operative in this invention comprise keratin of animal and human hair, gelatin, zein, fibrinogen, collagen of muscle and cartilage of animals, casein, hemoglobin, albumen, chlorophyll and natural products containing such proteins.

Plant and animal products which contain protein and/or carbohydrate can also be used in my invention. For example, ground peas, beans or corn performed satisfactorily. Dried skim milk, hair clippings, dried leather chips, dried blood and bagasse are also operative.

The natural polymers available in residual agricultural products which are normally waste materials are also suitable. Such materials may be vegetable matter, such as corn stalks, banana stalks, rice hulls, sawdust, potatoes, beans, sugar beets or grain which has become unfit for human consumption through spoilage. These natural or synthetic polymers break the oxygen bridge bonding the silica with the alumina to aid in removing the latter from the alumina of the mineral, whereby the latter can then be dissolved by chemical procedures, such as solution in sulfuric acid from which it can be released by neutralization.

The invention is further illustrated by means of the following examples which are provided for purposes of illustration only and are not to be construed as limiting the invention thereto. It will be appreciated by those skilled in the art that numerous modifications and quantities of materials and operating conditions, as well as equivalent materials, can be made without departing from the invention.

Example 1

25 grams of kaolin was stirred into 100 ml. of water. Then 25 grams of cellulose was added and the mixture acidified to a pH of about 2 with dilute sulfuric acid. The temperature was raised to a range of 190–212° F. and held in that range while the mixture was agitated for one hour. The mixture was then filtered and the filter cake was sintered slowly for about two hours to remove organic material and then was heated in a muffle furnace at 600° C. to remove the balance of organic material. The filter cake so produced was extracted with 300 ml. of 10% sulfuric acid by suspending the cake in the acid and boiling it for 10 minutes. The mixture was again filtered and the filtrate was made alkaline with concentrated sodium hydroxide solution to maintain the aluminum in solution. Activated charcoal was added and this alkaline solution was boiled for about 5 minutes and then filtered. The filtrate so obtained was heated to about 190° F. and acidified with sufficient sulfuric acid (1:1) to precipitate the aluminum hydroxide. The latter was removed by filtration and ignited to produce 9.2 grams (93% yield) of $Al_2O_3$.

Example 2

1 kg. of china clay was suspended in 4 liters of water containing sufficient muriatic acid to bring the pH to 2. To the suspension was added 1.5 kg. of corn starch and the resulting mixture was stirred and heated to 200–210° F. for 2 hours. The hot mixture was filtered and the filter cake was dried with hot air, heated to 200° C. for 4 hours to burn off organic material and then ignited at 650° C. in a muffle furnace. The resulting material was suspended in 12 liters of 10% sulfuric acid with good agitation and the suspension heated to 215° F. for one-half hour. The suspension was filtered and the filtrate brought to pH 10 with concentrated caustic soda solution. Activated charcoal was added, the filtrate was boiled for one-quarter hour and filtered. The resulting hot filtrate was acidified with dilute sulfuric acid to cause precipitation of the aluminum hydroxide. The latter was removed and ignited to alumina. The yield was 94% of theory.

Example 3

To a suspension of 1 kg. of kaolin in 4 liters of water containing sufficient sulfuric acid to adjust the pH to 2 was added 200 g. of a polyvinyl chloride acetate copolymer. The mixture was agitated and heated at 205–212° F. for 1½ hours, then filtered. The filter cake was dried and ignited as in Example 2, suspended in 10 liters of 10% sulfuric acid, heated with stirring to 215° F. for one-half hour, filtered and the filtrate neutralized with 35% caustic soda solution. The precipitate of aluminum hydroxide was removed and dried. The yield was 89%.

Example 4

In a procedure similar to that of Example 3, but using 200 mg. of polymethyl methacrylate, a yield of 79% of aluminum hydroxide was produced.

Example 5

In a procedure similar to that of Example 4, but using 210 g. of glycol-terephthalic acid resin (Dacron), a yield of 72% aluminum hydroxide was produced.

Example 6

A mixture of 1 kg. of kaolin and 1 kg. of crushed, dried peas (*Pisum sativum*) suspended in 6 liters of dilute hydrochloric acid (pH 2.5) was agitated at 50° F. for 15 hours. The mixture was filtered and the filter cake was dried and ignited at 400° C. to burn off the organic material, then at 650° C. for an hour. The residue was suspended in acid as in Example 3 and the aluminum hydroxide isolated by that procedure. The yield was 84%.

Example 7

By the procedure of Example 6, using 1 kg. of bagasse in lieu of the dried peas, a yield of 86% of aluminum hydroxide was obtained.

I claim:
1. Method of chemically separating alumina from clay which comprises heating an aqueous mixture of clay and an excess of an organic polymeric material selected from the group consisting of carbohydrates, proteins, vinyl resins, acrylic resins and polyester resins at a temperature of at least about 50° F. and a pH not greater than about 3, separating the insoluble materials from the water and heating said insoluble materials to a temperature of at least 400° C. until the organic materials are removed, thereby producing alumina chemically free of other components of the clay.

2. Method of claim 1 wherein the alumina which is produced is purified by solution in aqueous acid, precipitation therefrom in the form of aluminum hydroxide by neutralization of the solution, and calcination of the precipitate of aluminum hydroxide to alumina.

3. Method of chemically separating alumina from kaolin which comprises suspending kaolin in water acidified to a pH not greater than about 3 with a substantially equal quantity of cellulose, heating the resulting aqueous suspension to a temperature of at least about 190° F. for an hour, separating the insoluble materials from the water and heating said insoluble materials to a temperature of at least about 600° C. until the organic materials are removed, thereby producing alumina chemically free of the other components of the kaolin.

4. Method of claim 3 wherein the alumina which is produced is purified by solution in aqueous acid, precipitation therefrom in the form of aluminum hydroxide by neutralization of the solution and calcination of the precipitate of aluminum hydroxide.

5. Method of chemically separating alumina from kaolin which comprises suspending kaolin in water acidified to a pH not greater than about 3 with a substantially equal quantity of corn starch, heating the resulting aqueous suspension to a temperature of at least about 190° F. for an hour, separating the insoluble materials from the water and heating said insoluble materials to a temperature of at least about 600° C. until the organic materials are removed, thereby producing alumina chemically free of the other components of the kaolin.

6. Method of claim 5 wherein the alumina which is produced is purified by solution in aqueous acid, precipitation therefrom in the form of aluminum hydroxide by neutralization of the solution and calcination of the precipitate of aluminum hydroxide to alumina.

7. Method of chemically separating alumina from clay which comprises heating clay to a temperature of at least 180° F. in aqueous phase at a pH not greater than about 3 with an organic material selected from the group consisting of cellulose and starch, thereby solubilizing and removing the silica from the clay by forming a chemical combination between the silica and the organic material thus liberating alumina, and thereafter separating the alumina from the combination of silica and the organic material.

8. Method of claim 7 wherein the clay is kaolin.

References Cited

UNITED STATES PATENTS

| | | | |
|---|---|---|---|
| 1,249,125 | 12/1917 | Langford | 23—143 |
| 2,280,998 | 4/1942 | Brown | 23—143 |
| 2,438,488 | 3/1948 | Anderson et al. | 23—141 |
| 3,206,303 | 9/1965 | Goren | 23—182 X |

FOREIGN PATENTS

| | | |
|---|---|---|
| 358,000 | 9/1931 | Great Britain. |

OTHER REFERENCES

Chem. Ab., volume 53, 761E.

MILTON WEISSMAN, *Primary Examiner.*

G. T. OZAKI, *Assistant Examiner.*